United States Patent [19]

Walker

[11] Patent Number: 4,642,749
[45] Date of Patent: Feb. 10, 1987

[54] REPLICA DRIVER TRANSFORMER FOR INVERTER CIRCUIT

[75] Inventor: Charles S. Walker, King County, Wash.

[73] Assignee: Honeywell, Inc., Minneapolis, Minn.

[21] Appl. No.: 897,801

[22] Filed: Aug. 19, 1986

[51] Int. Cl.$^4$ .............................................. H02H 7/122
[52] U.S. Cl. ...................................... 363/56; 363/134; 331/113 A
[58] Field of Search ............ 331/113 A, 114; 363/24, 363/25, 56, 134

[56] References Cited

U.S. PATENT DOCUMENTS

| | | | |
|---|---|---|---|
| 3,305,793 | 2/1967 | Kammiller | 363/56 |
| 3,317,856 | 5/1967 | Wilkinson | 363/134 |
| 3,351,840 | 11/1967 | Yearley | 363/24 |
| 3,539,905 | 11/1970 | Schwarz | 363/56 |
| 3,638,100 | 1/1972 | Centala et al. | 363/133 |
| 3,667,027 | 5/1972 | Martin | 363/134 |
| 3,670,234 | 6/1972 | Joyce | 363/56 |
| 3,950,691 | 4/1976 | Ohba | 363/56 |
| 4,162,524 | 7/1979 | Jansson | 363/56 |
| 4,254,459 | 3/1981 | Belson | 363/134 |
| 4,439,822 | 3/1984 | Cocconi | 363/56 |

Primary Examiner—Patrick R. Salce
Assistant Examiner—Jeffrey Sterrett
Attorney, Agent, or Firm—C. Lamont Whitham; Roger W. Jensen

[57] ABSTRACT

An inverter circuit having an output power transformer if provided with a replica driver transformer which is a miniature "clone" of the power transformer. The replica driver transformer uses the same core material as the power transformer and is designed to saturate before the power transformer thereby shutting off the drive to the power switching transistors and saving them from burn out which might otherwise be caused by power transformer saturation. Reset circuits can be included as part of the circuit to assure successful start up preventing first-half-cycle-instant-burnout-syndrome occurrence.

14 Claims, 18 Drawing Figures

FIG. 5A
B-H CURVE FOR
TRANSFORMER 26

FIG. 5B
B-H CURVE FOR
TRANSFORMER 10

REPLICA DRIVER TRANSFORMER FOR INVERTER CIRCUIT

BACKGROUND OF THE INVENTION

1. Field of the Invention

The present invention is generally directed to inverter circuits and, more particularly, to improvements in such circuits which protect the power transistors from failure due to excessive junction temperature, current, voltage, or a combination of these.

2. Description of the Prior Art

Inverter circuits are commonly used to convert a d.c. voltage from batteries or a similar source to an a.c. voltage. The a.c. voltage may be stepped up or down and rectified or not depending on the load being supplied. Such circuits typically comprise an iron core power transformer having a center tapped primary winding and a secondary winding. A pair of switching transistors are connected to the primary winding and controlled by a driver circuit to alternately conduct to generate the a.c. current through the primary winding which is inductively coupled to the load attached across the secondary winding.

One common failure mode of these circuits occurs when the power transformer saturates causing very high currents in the power transistors. A number of approaches have been developed in the prior art to prevent power transistor failure. Representative of these are the following U.S. Patents.

U.S. Pat. No. 3,638,100 to Centala et al discloses a circuit to prevent the power transformer of an inverter circuit from presenting a low impedance upon core saturation. The Centala et al circuit employs an auxiliary commutating transformer whose windings are connected with those of the power transformer. The secondary windings of the auxiliary transformer are connected via diodes and an LC filter to a load. Upon saturation of the power transformer core, a high-reflected load impedance is presented to the power transistors.

U.S. Pat. No. 3,539,905 to Schwarz discloses a circuit which, like that of Centala et al, uses an auxiliary transformer. In this case, however, the auxiliary transformer directly measures the magnetising current by subtracting the load or secondary ampere-turns from the primary ampere-turns. When the magnetising current exceeds a given threshold (an indication of impending saturation), the power transistors are switched.

U.S. Pat. No. 4,162,524 to Jansson discloses a d.c. to d.c. converter which includes a circuit for sensing whether a current change in the main current path of the switching transistor reaches a given value subsequent to an initial current rise, if any, at the start of a conduction period. A control circuit is responsive to the sensing circuit to remove the drive to the switching transistor if the given value is reached.

U.S. Pat. No. 3,305,793 to Kammiller discloses a d.c. to a.c. converter with an overload protection circuit. This circuit includes a bypass current path paralleling a bistable voltage source connected to a load. Upon the occurrence of a relatively large load current surge, the bistable voltage source is in effect removed from the circuit.

U.S. Pat. No. 3,950,691 to Ohba discloses a d.c. to a.c. inverter with an overload protection circuit. This circuit senses potentially damaging transient signals, isolates those signals from the amplifier circuitry, and returns most of the power of the transient signals to the d.c. supply. Individual emitter resistors are used to control the maximum collector currents in the output transistors.

U.S. Pat. No. 3,351,840 to Yearley discloses a saturating-transformer type of inverter in which diodes and Zener diodes have been added to prevent switching transistor collector spikes.

U.S. Pat. No. 3,670,234 to Joyce discloses an overvoltage protector circuit connected between the regulated output and the midpoint of the primary side of a driver transformer in a pulse width modulated voltage regulator.

While the prior art circuits have provided a degree of protection to the power transistors in inverter circuits, there is a continuing need to improve that protection, particularly in inverter circuits which must exhibit high reliability in the field. Moreover, it is desirable to provide such protection to the switching transistors of inverter circuits in a simple and inexpensive way.

SUMMARY OF THE INVENTION

It is therefore an object of this invention to provide an inverter having improved protection of the switching transistors from high currents due to power transformer saturation.

It is another object of the present invention to provide a way of resetting the power transformer in an inverter circuit prior to start up of the circuit to prevent early saturation of the power transformer due to residual magnetism of the core.

According to the invention, the foregoing objects are attained by providing a replica driver transformer which is a minature power transformer "clone". This replica driver transformer uses the same core material and is designed to saturate before the power transformer thereby shutting off the drive to the power transistors. Reset circuits can be included as a refinement to the basic invention to assure successful start up by preventing first-half-cycle-instant-burnout-syndrome occurance.

BRIEF DESCRIPTION OF THE DRAWINGS

The foregoing and other objects, aspects and advantages of the invention will be better understood from the following detailed description of the preferred embodiments of the invention with reference to the drawings, in which.

DETAILED DESCRIPTION OF THE PREFERRED EMBODIMENTS OF THE INVENTION

Figure 1:
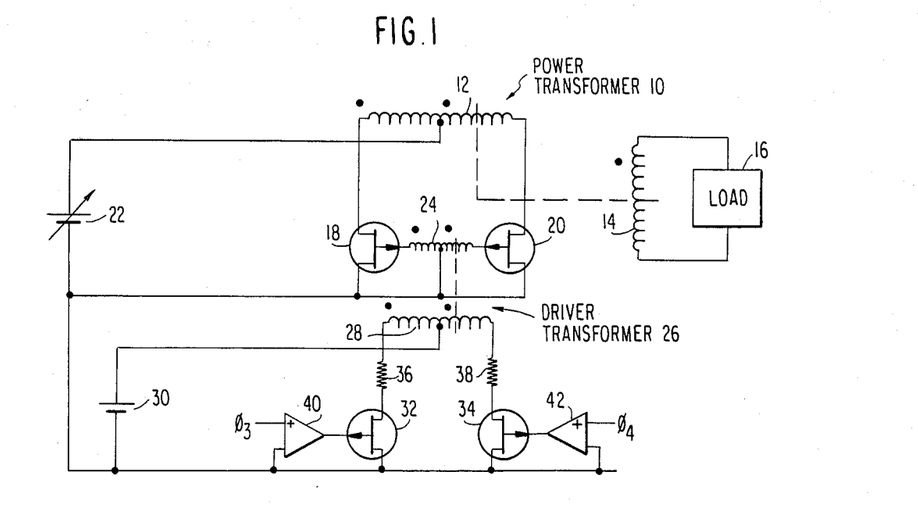
FIG. 1 is a schematic circuit diagram of the basic inverter according to the invention employing the replica driver transformer.

Turning now to the drawings wherein like reference numerals designate identical or similar components, and more particularly to FIG. 1, there is shown a schematic circuit diagram of the basic inverter according to the invention. The inverter comprises a power transformer 10 having a center tapped primary winding 12 and a secondary winding 14 on an iron core. A load 16 is connected across the secondary winding 14. A pair of power MOSFETs 18 and 20 have their sources connected to respective ends of the center tapped primary transformer 12. The center tap of transformer 12 is connected to the positive side of a first d.c. power supply, here illustrated as a battery the output voltage of which is adjustable. The negative side of power supply 22 is connected in common the drains of MOSFETs 18 and 20 and to the center tap of the secondary winding 24 of a replica driver transformer 26. The gates of the MOSFETs 18 and 20 are connected to respective ends of the secondary winding 24.

The driver stage for the inverter includes the replica driver transformer 26 which further includes a center tapped primary winding 28. The center tap of primary winding 28 is connected to the positive side of a second power supply 30, here illustrated as a battery. The negative side of the power supply 30 is connected in with the negative side of power supply 22 to provide a common voltage reference. The sources of FET driver transistors 32 and 34 are connected to respective ends of the primary winding 28 through current limiting resistors 36 and 38, respectively. Driver electronics, well known in the art, are connected to the bases of driver FETs 32 and 34 and are here illustrated as amplifiers 40 and 42, respectively.

According to the invention, the replica driver transformer 26 is an almost exact replica of power transformer 10, except for size. The core materials for the two transformers have similar magnetic and thermal characteristics and, in the preferred embodiment, is the same material, but the maximum flux density is slightly higher as is the temperature rise. Since the replica driver transformer 26 is smaller than the power transformer 10, it has a smaller thermal inertia, meaning simply that its temperature rise in operation will be at a faster rate than that of the power transformer. However, rather than rely on the differential rate of rise of temperature, it is desirable to design the replica driver transformer 26 to operate at a higher temperature than the power transformer 10. Furthermore, replica driver transformer 26 is located so that the ambient temperature approximates that of power transformer 10. Thus, by taking these precautions, replica driver transformer 26 will saturate before power transfomer 10, shutting off the drive voltages to power MOSFETs 18 and 20 thereby saving these transistors from almost instant destruction. The driver transistors 32 and 34 are protected by the current limiting resistors 36 and 38, respectively.

Figure 2:
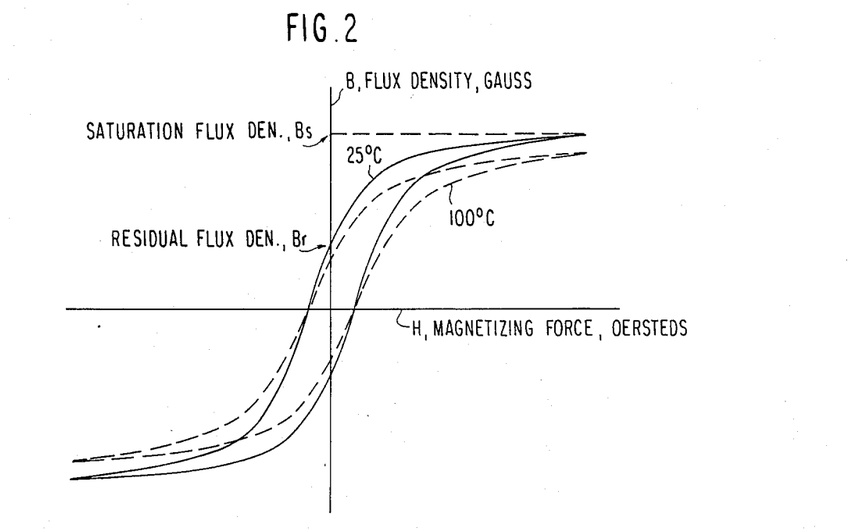
FIG. 2 is a graph showing a typical hysteresis loop for magnetic materials commonly used in inverter circuits.
Figures 3, 4:
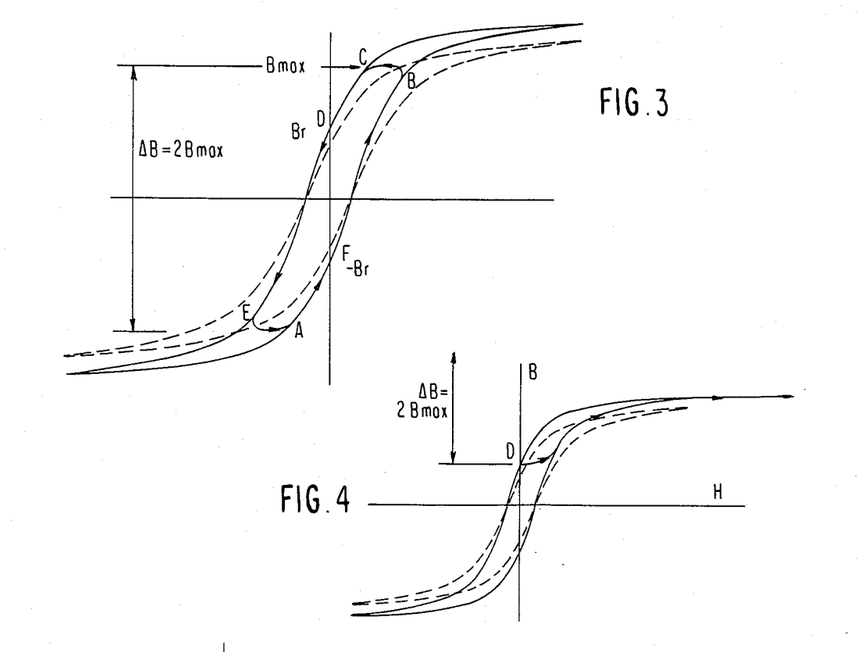
FIG. 3 is a graph showing the locus of normal flux density in a hysteresis loop.
FIG. 4 is a graph showing a hysteresis loop and illustrating saturation resulting from starting a residual flux density.
Figures 5A, 5B:
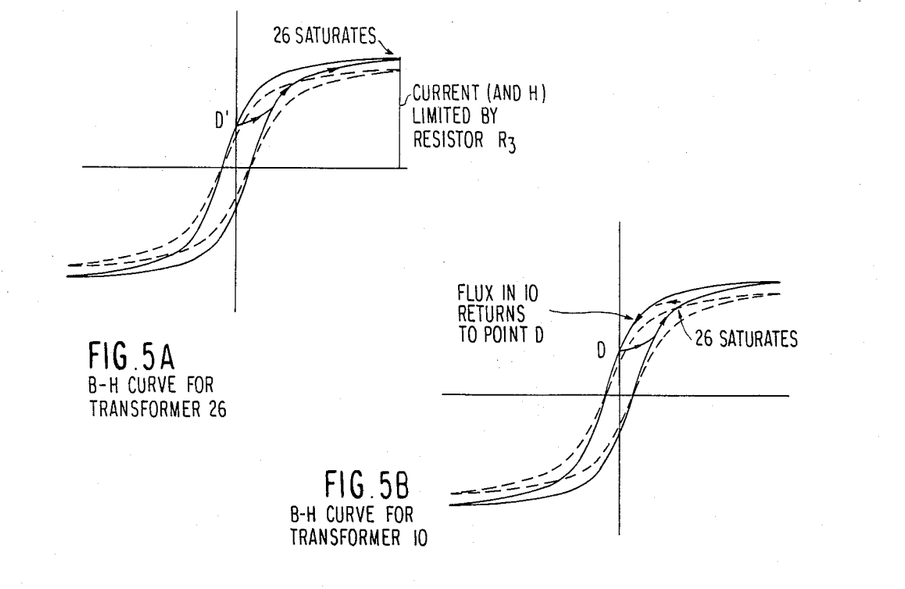
FIGS. 5A and 5B are graphs showing hysteresis curves for the replica driver and the power transformers, respectively, illustrating the saturation of the replica driver transformer before the power transformer.

FIG. 2 shows a typical hysteresis curve for magnetic materials commonly used in inverter circuits. During normal operation, the path traced is A-B-C-D-E as shown in FIG. 3. If the first power supply 22 is suddenly turned off, as for example, between points B and D or E and F, a residual magnetism remains. This is referred to as residual flux density $B_r$ or $-B_r$, as shown in FIG. 3. Assume for example that there is a residual flux density $B_r$, if the power supply 22 is re-energized, the flux density starts at point D and tries to move upward by an amount of $2B_{max}$, well into saturation as shown in FIG. 4. Power transformer 10 then appears as a short circuit, and MOSFET 18 is subjected to the full voltage of power supply 22 producing a very large current resulting in a likely burnout of that transistor. A similar analysis can be made for the case where there is a residual flux density $-B_r$. In either case, however, with this invention the replica driver transformer 26 saturates slightly ahead of power transformer 10, as shown in FIGS. 5A and 5B, and transistor 18 is saved.

As can be seen from FIGS. 2, 3, 4, or 5A and 5B, the problem becomes worse as the core temperature increases. The problem is further aggravated when the two power supplies 22 and 30 are not coordinated. This can happen if the first power supply 22 is shut off before the second power supply 30. The memory "states" of the two cores can be different. For example, power transformer 10 can be at $+B_r$ and replica driver transformer 26 can be at $-B_r$. If this happened, power transformer 10 would saturate before replica driver transformer 26 with the result that one of transistors 18 or 20 could be destroyed.

Figure 6:
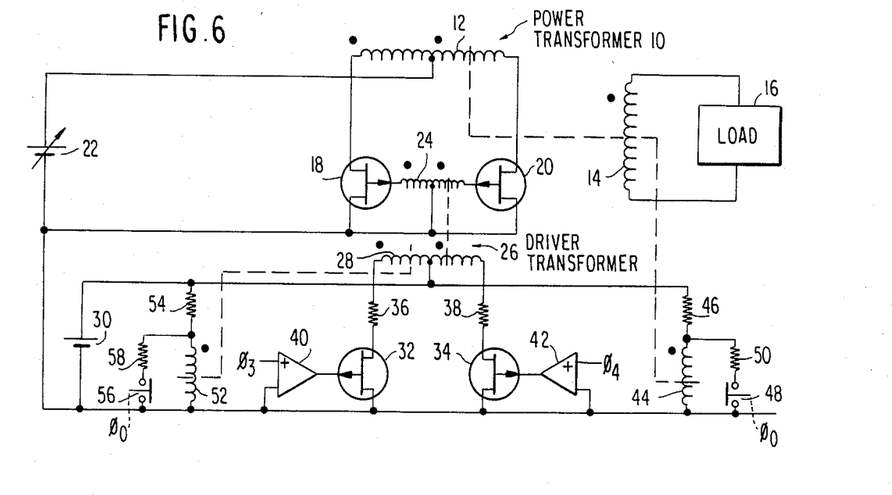
FIG. 6 is a schematic circuit diagram showing a modification of the basic inverter circuit according to the invention incorporating reset windings added to the replica driver transformer and the power transformer.

To solve this problem, a further refinement of the invention is shown in FIG. 6. A first reset winding 44 for power transformer 10 is connected in series with a resistor 46 across the second power supply 30. A first switch 48 is connected in series with a resistor 50, and this combination is connected in parallel with the first reset winding 44. A second reset winding 52 for replica driver transformer is connected in series with a resistor 54 across the second power supply 30. A second switch 56 is connected in series with a resistor 58, and this combination is connected in parallel with the second reset winding 52. It will of course be understood by those skilled in the art that while switches 48 and 56 are shown in the schematic circuit diagram of FIG. 6 as mechanically actuated switches, these switches are in fact implemented as solid state switches such as transistors the conduction of which are controlled by control circuit (not shown) of conventional design.

Figure 7A:
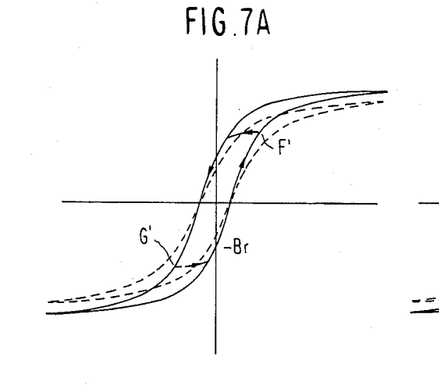
FIGS. 7A and 7B are graphs showing hysteresis curves for the replica driver and power transformers, respectively, with the addition of the reset windings shown in FIG. 6.
Figure 7B:
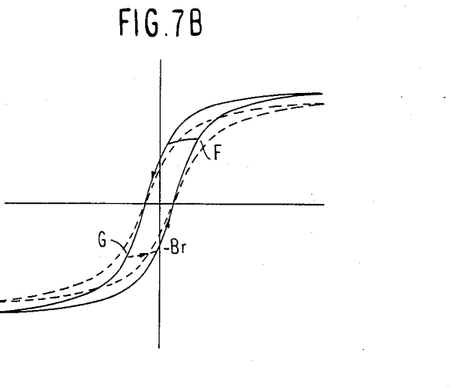

The start up sequence is as follows:

1. Through a count down circuit, driver FETs 32 and 34 are both held in the "off" state.
2. Switches 48 and 56 are momentarily opened allowing reset current to flow through both the power transfomer 10 and the replica driver transformer 26.
3. Switches 48 and 56 are then closed. The cores of both transformers are now at $-B_r$.
4. FET 32 is turned on, for approximately three eighths of a cycle of the operating frequency. The flux moves up to point F' in replica driver transformer 26 and F in power transformer 10 as shown in FIGS. 7A and 7B, respectively.
5. FET 32 is turned off and FET 34 is turned on for a full half cycle moving the fluxes to G' and G, respectively.
6. Normal operation continues until the inverter shuts off. If, per chance for example, a transient causes a flip-flop to reset resulting in FET 32 staying on for two consecutive half cycles, replica driver transformer 26 will saturate first. This protects MOSFET 18. When FET 32 shuts off and FET 34 turns on, normal operation is restored.

Figure 8:
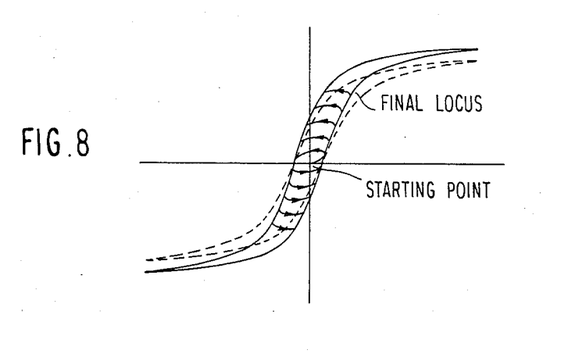
FIG. 8 is a graph showing a hysteresis curve illustrating a spiraling flux locus for slowly increasing power supply voltages.

Other modifications to the invention are also possible. For example, power transformer 10 can be designed so that $2B_{max}$ is less than the quantity $(B_s-B_r)$. This results in at least a two times over design for all cases. Further, the power supplies 22 and 30 can be coordinated so that their voltages rise and fall together. In this way, both transformers transverse the loop shown in FIG. 8. In the example shown, it is assumed that the flux density in each core starts near zero.

Figure 9:
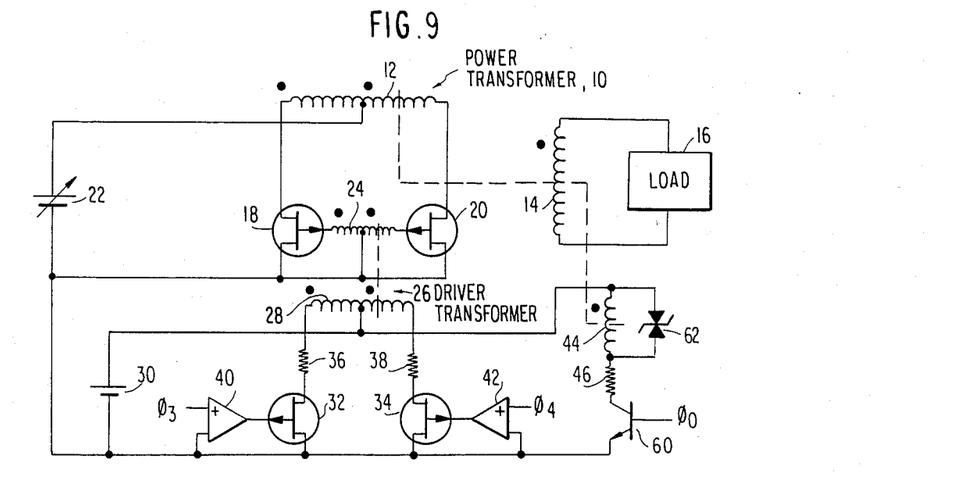
FIG. 9 is a schematic circuit diagram showing a modification of the circuit shown in FIG. 6 where a reset winding is provided only for the power transformer.

A modification of the circuit of FIG. 6 is shown in FIG. 9. This circuit eliminates the reset winding for the replica driver transformer 26 but retains the reset winding 44 for the power transformer 10. In this circuit, the switch 48 is replaced with an NPN bipolar transistor 60 in series with reset winding 44 and resistor 46. A Zener diode 62 is connected in parallel with the reset winding 44. Control logic signals of $\phi_0$, $\phi_3$ and $\phi_4$ are supplied to the base of transistor 60 and the driver circuits 40 and 42, respectively.

Figure 10:
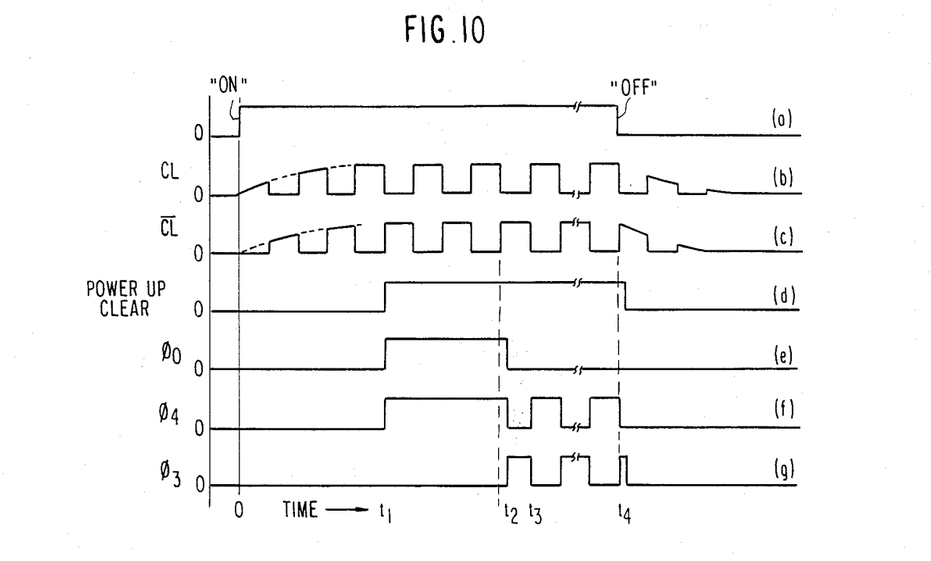
FIG. 10 is a waveform chart showing the logic signals required to achieve the correct reset signals for the circuit of FIG. 9.

The circuit shown in FIG. 9 would be used for non-gapped power transformer cores exhibiting high $B_r/B_{sat}$ ratios. This circuit provides flux density synchronization between the power transformer 10 and the replica driver transformer 26 by resetting both transformers to $-B_r$ by supplying logic signal $\phi_0$ to reset the power transformer and logic signal $\phi_4$ to reset the replica driver transformer. The logic signals required to achieve the correct reset signals are shown in FIG. 10. With reference to FIG. 10, at $t=0$, the power is turned on as indicated by timing waveform a. Timing waveforms b and c show the clock signals increase from zero volts to their steady state voltage. In timing waveform d, at $t=t_1$, the power-up clear circuit has verified that control circuit voltages have reached an adequately high level. In timing waveform e, power transformer 10 is reset by the application of logic signal $\phi_0$ to the reset winding 44 over the period $t_1 \leq t \leq t_2$. In a similar way, replica driver transformer 26 is reset by logic signal $\phi_4$ as shown in timing waveform f. Finally, in timing waveform g, at $t=t_2$, $\phi_3$ goes from a logic "0" to a logic "1", turning on FET 32 which, in turn, turns on MOSFET 18. Neither of the MOSFETs 18 or 20 are turned on before $t=t_2$.

Figure 11:
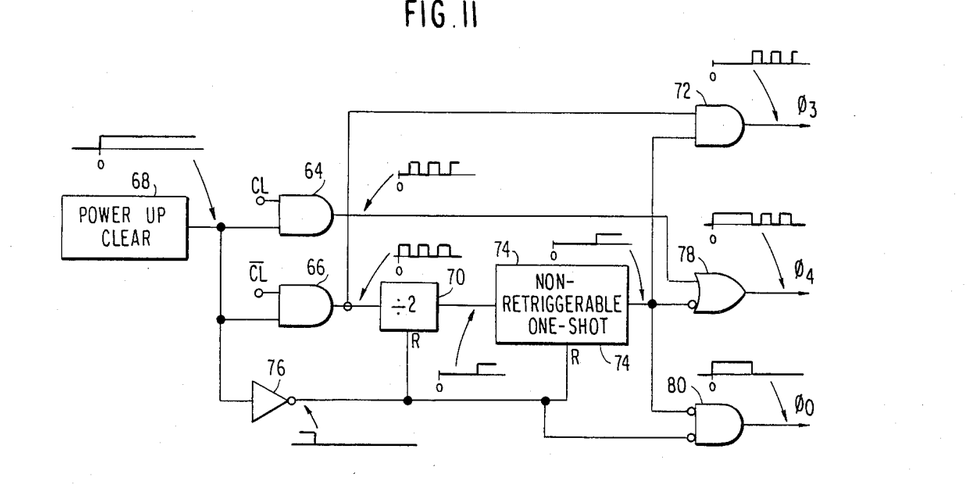
FIG. 11 is a logic diagram of a circuit which may be used to provide the signal waveforms shown in FIG. 10.

One implementation to develop the logic signals illustrated in FIG. 10 is shown in FIG. 11. In this circuit, a pair of AND gates 64 and 66 are respectively supplied with the true and complement clock signals. These AND gates are enabled by a power up clear circuit 68. The output of the AND gate 66 is connected to a divide by two circuit 70 and one input of another AND gate 72. The divide by two circuit 70 may be a single counter stage. The output of the divide by two circuit 70 is connected to the input of a one-shot multivibrator 74. Both the divide by two circuit 70 and the one-shot multivibrator 74 are reset by the output of an inverter 76 connected to the output of the power up clear circuit 68. The output of the one-shot 74 is connected to the inverting input of an OR gate 78. The other, noninverting input to the OR gate is connected to the output of AND gate 64. A further AND gate 80, with two inverting inputs, has one input connected to the output of one-shot 74 and the other to the output of inverter 76.

In operation, the sequence begins with an output from the power up clear circuit 68 enabling AND gates 64 and 66 to pass the clock signals. The divide by two circuit 70 provides a double clock period for transformer reset. The one-shot 74 reduces the first half cycle from $\frac{1}{2}$ T to approximately $\frac{3}{8}$ T to allow for the flux starting point at $-B_r$ instead at near $-B_{max}$. The one-shot inverted output is then combined with the clock from AND gate 64 to produce the logic signal $\phi_4$ plus gating for steady-state operation at the output of OR gate 78. In a similar manner, to get logic signal $\phi_3$, the one-shot output is combined with the complement clock signal from AND gate 66 in AND gate 72 but, of course, there is no reset period. To obtain the reset logic signal $\phi_0$, the inverted output of one-shot 74 is combined with the output of inverter 76 in AND gate 80. This turns on reset transistor 60 for two plus cycles and sets power transformer's flux density at approximately $-B_r$.

Figure 12:
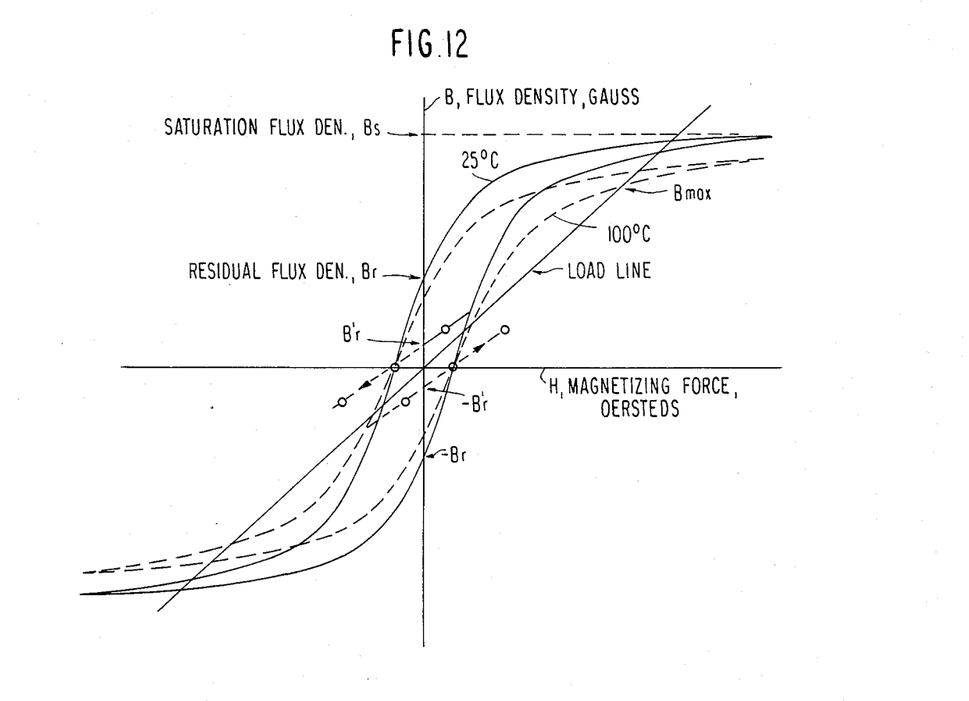
FIG. 12 is a graph showing a hysteresis curve and illustrating how air gaps in the cores of the replica driver and power transformers have the effect of reducing the residual flux density.

In yet another modification, gapped cores exhibiting low $B_r'/B_{sat}$ ratios are used for the power transformer 10 and the replica driver transformer 26. The air gaps in the cores of these transformers has the effect of reducing the residual flux density in the power transformer from $B_r$ to a smaller value, $B_r'$, as shown in FIG. 12. In the specific example shown, the air gap skews the B-H curve to the right and reduces $B_r$ from approximately 1000 gauss to approximately 300 gauss. The penalty paid is higher magnetization current, but this current is almost purely inductive and, therefore, does not increase losses appreciably. Without the air gap, the residual flux density can be any value between $+B_r$ to $-B_r$. With the gap, the range is reduced to $+B_r'$ to $-B_r'$.

A gap of proportional size added to replica driver transformer 26 not only preserves the replica transformer concept of the basic invention but also reduces its residual flux density range. Because of this, it is possible to eliminate the power transformer reset winding and prevent first cycle power transformer saturation by taking the following two precautions:

1. Turn the first MOSFET 18 on for only one fourth cycle for the first half cycle.
2. Make $B_{max}<(B_{sat}-3B_r')$ where
    $B_{max}$ = maximum normal operating flux density for power transformer 10

$$= \frac{V_{ps1} \times 10^8}{4.0\, N_p f A_{fc}}$$

($V_{ps1}$ is voltage of power supply 22)

$B_r'$ = maximum residual flux density with gap

Figure 13:
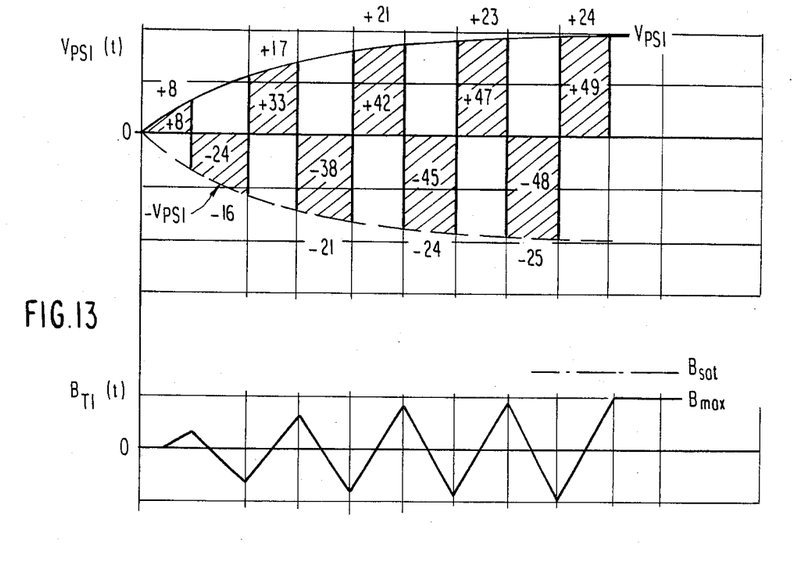
FIGS. 13, 14 and 15 are graphs showing power supply and flux density curves as a function of time for three different cases in which conduction of the first switching transistor is limited to one fourth cycle on the first half cycle.
Figure 14:
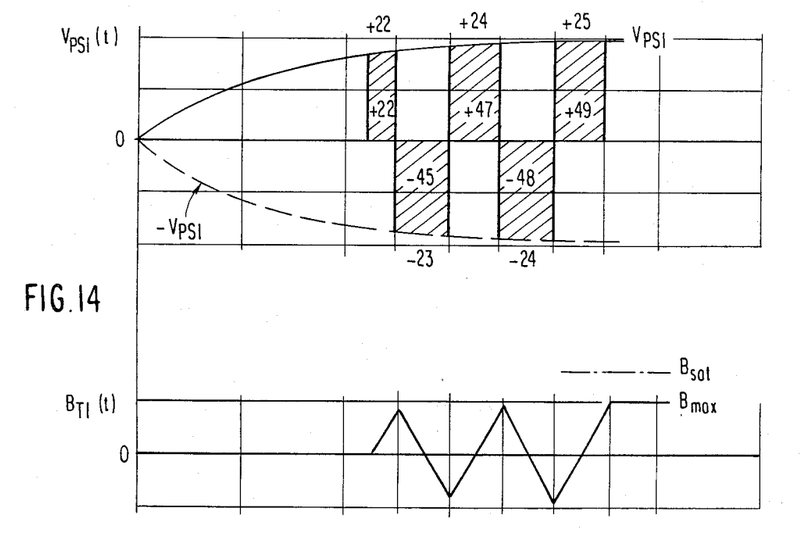
Figure 15:
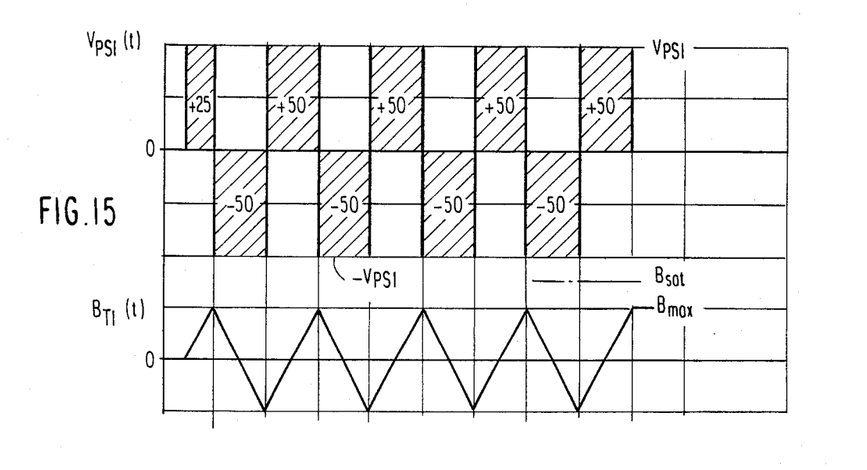
Figure 16:
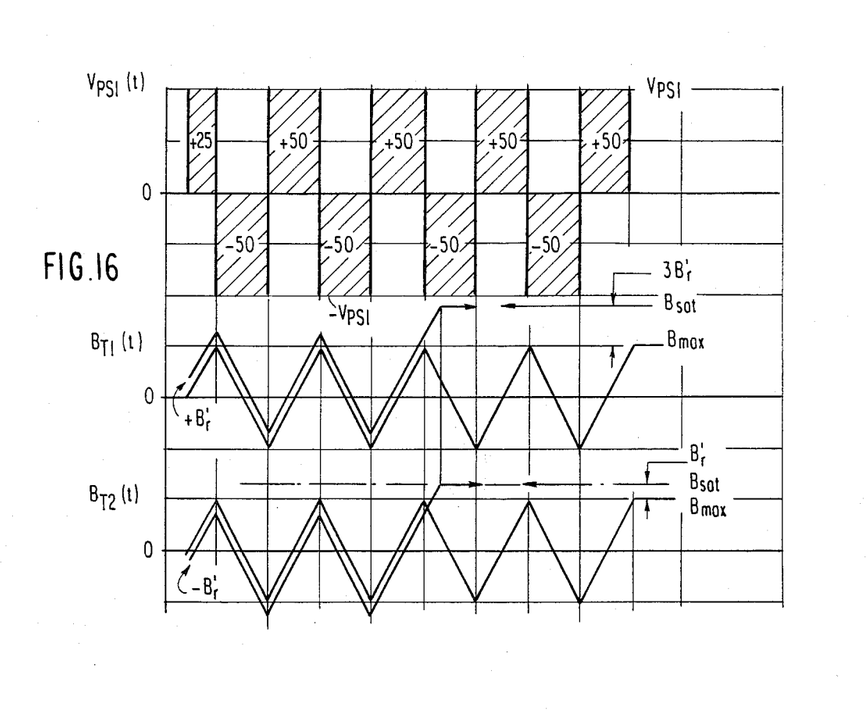
FIG. 16 is a graph showing power supply and flux density curvers as a function of time illustrating a worst case condition of the replica driver and power transformers starting with a residual flux density mismatch.

FIGS. 13, 14 and 15 show three different cases using these criteria. In FIG. 13, beginning with t=0, the main power supply voltage, $V_{ps1}$, increases relatively slowly to the steady state value. The MOSFETs 18 and 20 are gated but are on only one fourth cycle for the first half cycle and on normally thereafter. In FIG. 14, MOSFET gating is delayed until the third cycle. As before, the MOSFET is only on for one fourth cycle for the first half cycle. In the case shown in FIG. 15, $V_{ps1}(t)$ is at full value when the MOSFETs are turned on. Again, the MOSFET is only on for one fourth cycle of the first half cycle. In each of the cases illustrated in FIGS. 13, 14 and 15, by limiting the first MOSFET to being on for only one fourth cycle of the first half cycle, saturation problems are avoided. Further, by making $B_{max}+3B_r'$ smaller than $B_{sat}$ in power transformer 10, saturation caused by worst case $B_r'$ offsets can be avoided. This is illustrated in FIG. 16 which shows that even if the cores of the power transformer 10 and the replica driver transformer 26 begin at worst case residual flux density mismatch, the replica driver transformer 26 will saturate first.

While the invention has been described in terms of a basic preferred embodiment and modifications and alterations thereto, those skilled in the art will understand that the invention can be practiced with still other modifications and alterations with in the scope of the appended claims.

Having thus descirbed my invention, what I claim as new and desire to secure by Letters Patent is as follows:

1. A power inverter circuit comprising:
   at least a first switching transistor having first and second main conducting electrodes and a control electrode;
   a power transformer having a primary winding and a secondary winding;
   a load connected to the secondary winding of said power transformer;
   a first power supply connected in series with the primary winding and the first and second main conducting electrodes of said first switching transistor;
   at least a first driver transistor having first and second main conducting electrodes and a control electrode;
   a replica driver transformer having a primary winding and a secondary winding, the secondary winding being connected to the control electrode of said first switching transistor, said replica driver transformer being a miniature version of said power transformer but designed to saturate before said power transformer;
   a second power supply connected in series with the primary winding of said replica driver transformer and the main conducting electrodes of said first driver transistor; and
   driver circuit means connected to the control electrode of said first driver transistor for turning said driver transistor on and off.

2. The inverter circuit recited in claim 1 wherein both said power transformer and said replica driver transformer have cores of magnetic material exhibiting a hysteresis curve for variations in flux density as a function of magnetizing force, the cores of said power transformer and said replica driver transformer being made of a material having substantially similar magnetic characteristics.

3. The inverter circuit recited in claim 2 wherein the hysteresis curve characteristic of said cores varies with changes in temperature, said power transformer and said replica driver transformer being physically mounted so that the ambient temperatures thereof are substantially the same.

4. The inverter circuit recited in claim 3 wherein the replica driver transformer is designed to operate at a higher temperature than the power transformer.

5. The inverter circuit recited in claim 4 wherein the power transformer and the replica driver transformer have similar thermal characteristics but the replica driver transformer has a smaller thermal inertia than the power transformer.

6. The inverter circuit recited in claim 2 further including initializing means coupled to said power transformer and said replica driver transformer for initializing the flux densities of said transformers when said inverter circuit is energized from said first and second power supplies.

7. The inverter circuit recited in claim 6 wherein said initializing means includes a reset winding for said power transformer and energizing means connected to said reset winding for causing a momentary current to flow through said reset winding.

8. The inverter circuit recited in claim 7 wherein said initializing means further includes a reset winding for said replica driver transformer and means connected to said reset winding for causing a momentary current to flow through said reset winding.

9. The inverter circuit recited in claim 7 wherein said initializing means further includes logic circuit means connected to said driver circuit means for initially turning on said first driver, transistor to cause a momentary current to flow through the primary winding of said replica driver transformer.

10. The inverter circuit recited in claim 2 wherein the cores of said power transformer and said replica driver transformer are made of a material exhibiting a low ratio of residual flux density to saturated flux density, said cores being provided with air gaps to reduce the residual flux densities of said cores.

11. The inverter circuit recited in claim 10 wherein the maximum normal operating flux density of the core of said power transformer is less than the difference of the saturated flux density and three times the residual flux density with an air gap in the core.

12. The inverter circuit recited in claim 1 wherein the primary winding of said power transformer is a center tapped winding and both the primary and secondary windings of said replica driver transformer are center tapped windings, said first power supply being connected to the center tap of the primary winding of said power transformer and said second power supply being connected to the center tap of the primary winding of said replica driver transformer, said inverter circuit further comprising:
   a second switching transistor having first and second main conducting electrodes and a control electrode, said control electrode being connected to the secondary winding of said replica driver transformer and said first and second main conducting electrodes being connected in series between said first power supply and one half the primary winding of said power transformer; and a second driver transistor having first and second main conducting electrodes and a control electrode, said first and second main conducting electrodes being connected in series with said second poser supply and one half the primary winding of said replica driver transformer, said driver circuit means being further connected to the control electrode of said second driver transistor for alternately turning said first and second driver transistors on and off.

13. The inverter circuit recited in claim 12 further including first and second current limiting resistors respectively connected in series with the first and second main conducting electrodes of said first and second driver transistors.

14. The inverter circuit recited in claim 12 wherein said first and second switching transistors are power MOSFETs and said first and second driver transistors are FETs.

* * * * *